(No Model.)

P. CALDWELL, Jr.
SPADE OR SHOVEL.

No. 519,104. Patented May 1, 1894.

Witnesses;

Inventor:
Peter Caldwell Jr

UNITED STATES PATENT OFFICE.

PETER CALDWELL, JR., OF WARRINGTON, ENGLAND.

SPADE OR SHOVEL.

SPECIFICATION forming part of Letters Patent No. 519,104, dated May 1, 1894.

Application filed November 23, 1891. Serial No. 412,734. (No model.) Patented in England August 27, 1890, No. 13,452.

*To all whom it may concern:*

Be it known that I, PETER CALDWELL, Jr., a subject of the Queen of Great Britain and Ireland, and a resident of Warrington, in the county of Lancaster, England, have invented certain new and useful Improvements in Spades or Shovels, (for which I have obtained Letters Patent in England, dated August 27, 1890, No. 13,452,) of which the following is a specification.

This invention relates to all kinds of langet or strapped spades and shovels and its objects are to enable the spade or shovel to be manufactured without welding, and also to enable the "cofer" or opening in the blade to be dispensed with and thus to obviate the necessity for employing wedgewood and rivets in the blade.

In carrying out my invention, I forge, cut or otherwise similarly produce a blank having a tang thereon, the shape and dimensions of the blank and tang being determined by the shape and dimensions of the required spade or shovel. The tang on the blank is then sawed or split and the blade and straps are forged to the required form from the solid.

If the spade be required to be provided with a tread, this is also forged from the solid blade or blank, so that there is no weld or joint in any part of the spade and straps, and it is impossible for the treads to be forced off the blade.

I will more particularly describe my said invention with reference to the accompanying drawings, in which—

Figure 3:
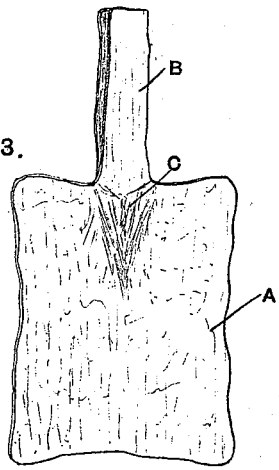
Figure 4:
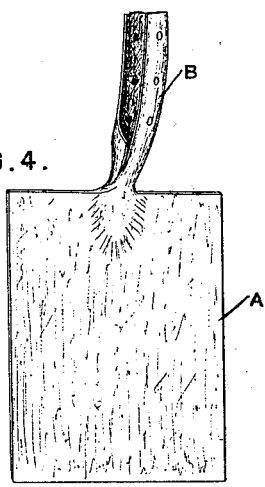
Figure 5:
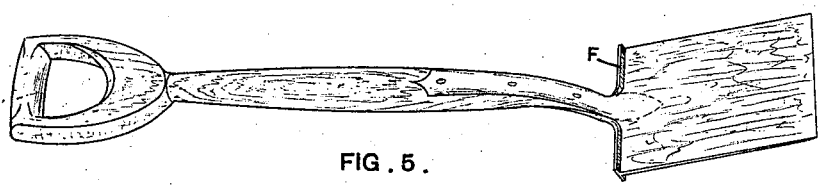

Figures 1, 2, 3, and 4 represent the spade or shovel in successive stages of manufacture; and Fig. 5 a completed and handled spade constructed according to these improvements.

Figure 1:
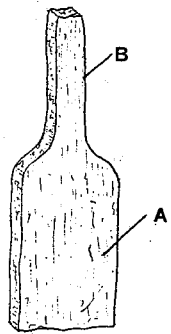
Figure 2:

Fig. 1 shows the rough blank of which the part A will form the blade of the future spade or shovel, and the part B the straps. As shown in Fig. 2 which represents the article in the following stage of manufacture, the tang B has been cut or slit longitudinally down to the blade so as to produce the elementary form of the two straps. This cut or slit is preferably made by means of a circular saw such as is employed for cutting iron and steel. The blank is next hammered or forged by the usual means to the approximate form of the future spade or shovel as indicated by Fig. 3, the upper middle part C or the whole of the central and upper part of the blade being left thicker than the remainder of the blade to such an extent as may be required to insure the necessary strength or form. The blade is then cut or sheared by the customary means to the required dimensions as indicated by Fig. 4. Before the blade is cut (or afterward, if desired) the straps are forged or drawn out from the divided tang B to the finished shape, upon a suitably formed mandrel or former, this mandrel or former having such a shape and dimensions as will enable the handle to fit in the space left by it between the straps. Finally the straps are trimmed by shears as indicated by Fig. 5.

When the spade is required to be provided with a tread such as is shown at F in Fig. 5, the upper ends of the solid blade are hammered down or forged out of the solid blade so as to form the treads, during the process of manufacture, and preferably after the stage represented by Fig. 3.

Having now particularly described my said invention, I declare that what I claim is—

A spade or shovel having a handle socket formed integrally with the blade and consisting of two langets or tongues separated down to the line of the treads on a plane coincident with the blade, and embracing the handle on opposite sides, the blade being solid throughout, substantially as described.

In testimony that I claim the foregoing as my invention I have signed my name, in presence of two witnesses, this 1st day of October, 1891.

PETER CALDWELL, JR.

Witnesses:
WILLIAM E. HEYS,
GEORGE W. ROWE.